United States Patent
Chen et al.

(10) Patent No.: US 9,502,892 B2
(45) Date of Patent: Nov. 22, 2016

(54) ELECTROSTATIC DISCHARGE PROTECTION CIRCUIT AND RELATED METHOD

(71) Applicant: Taiwan Semiconductor Manufacturing Company, Ltd., Hsin-Chu (TW)

(72) Inventors: Chia-Hui Chen, Hsinchu (TW); Po-Hsiang Lan, Taipei (TW); Chien-Yuan Lee, Zhubei (TW); Tsung-Ju Yang, Taichung (TW); Tzu-Yi Yang, Taipei (TW); Kuo-Ji Chen, Wu-Ku (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 133 days.

(21) Appl. No.: 14/030,101

(22) Filed: Sep. 18, 2013

(65) Prior Publication Data
US 2015/0077886 A1  Mar. 19, 2015

(51) Int. Cl.
*H02H 9/00* (2006.01)
*H02H 9/04* (2006.01)

(52) U.S. Cl.
CPC .................... *H02H 9/046* (2013.01)

(58) Field of Classification Search
CPC ....................................... H02H 9/046

USPC .......................................................... 361/56
See application file for complete search history.

(56) References Cited

U.S. PATENT DOCUMENTS

| | | | |
|---|---|---|---|
| 5,644,167 A | 7/1997 | Weiler et al. | |
| 5,946,177 A * | 8/1999 | Miller et al. | 361/56 |
| 2004/0217742 A1* | 11/2004 | Ribarich et al. | 323/222 |
| 2005/0006706 A1 | 1/2005 | Stefanov et al. | |
| 2005/0018370 A1* | 1/2005 | Arai et al. | 361/56 |
| 2007/0205800 A1* | 9/2007 | Ker et al. | 326/21 |
| 2008/0024714 A1 | 1/2008 | Park | |
| 2008/0297960 A1* | 12/2008 | Chen | H01L 27/0285 361/56 |
| 2009/0079071 A1 | 3/2009 | Webb | |
| 2011/0080678 A1* | 4/2011 | Zhao | H01L 27/0285 361/56 |
| 2012/0182654 A1* | 7/2012 | Wang et al. | 361/56 |
| 2013/0063843 A1 | 3/2013 | Chen et al. | |

FOREIGN PATENT DOCUMENTS

CN  101118327 A  2/2008

* cited by examiner

*Primary Examiner* — Thienvu Tran
*Assistant Examiner* — Tien Mai
(74) *Attorney, Agent, or Firm* — Slater Matsil, LLP

(57) ABSTRACT

A device includes a first power transistor, a second power transistor electrically connected in series with the first power transistor, a first electrostatic discharge (ESD) detection circuit, and a first control circuit electrically connected to the first ESD detection circuit and the first power transistor.

20 Claims, 6 Drawing Sheets

ELECTROSTATIC DISCHARGE PROTECTION CIRCUIT AND RELATED METHOD

BACKGROUND

The semiconductor industry has experienced rapid growth due to improvements in the integration density of a variety of electronic components (e.g., transistors, diodes, resistors, capacitors, etc.). For the most part, this improvement in integration density has come from shrinking the semiconductor process node (e.g., shrinking the process node towards the sub-20 nm node).

Cheaper, more area-efficient integrated components have aided a shift in DC-DC converters to switched-mode architectures. While typically requiring more control circuitry than linear converters, switched-mode converters can be designed for higher power efficiency.

Electrostatic discharge (ESD) is a danger to most integrated circuits (ICs) that occurs when a large amount of charge is built up suddenly at one or more nodes of the IC. ESD protection circuits mitigate ESD events, and prevent damage to, or destruction of, internal circuitry of the IC. For example, an ESD circuit may detect the charge, disconnect the internal circuitry from the source of the charge, and then direct the charge through special electrical paths to ground.

BRIEF DESCRIPTION OF THE DRAWINGS

For a more complete understanding of the present embodiments, and the advantages thereof, reference is now made to the following descriptions taken in conjunction with the accompanying drawings, in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Embodiments will be described with respect to a specific context, namely ESD protection circuits, buck converter circuits, and related methods. Other embodiments may also be applied, however, to other types of converter and/or ESD circuits.

Throughout the various figures and discussion, like reference numbers refer to like objects or components. Also, although singular components may be depicted throughout some of the figures, this is for simplicity of illustration and ease of discussion. A person having ordinary skill in the art will readily appreciate that such discussion and depiction can be and usually is applicable for many components within a structure.

In the following disclosure, novel ESD and converter circuits and methods are introduced. The ESD and converter circuits use large power transistors and parasitic NPN effects to provide ESD protection to the converter circuit.

Figure 1:
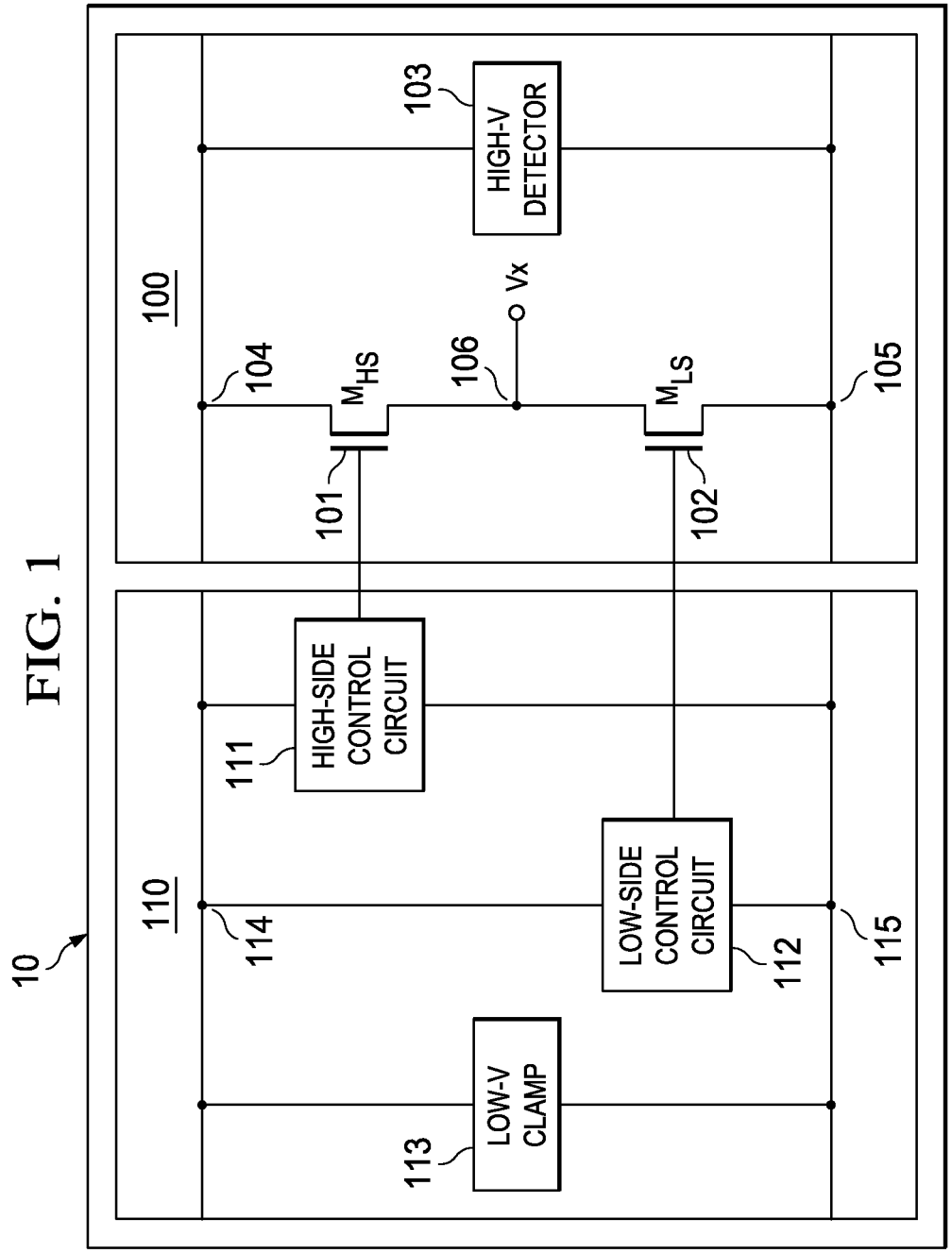
FIG. 1 is a schematic diagram showing a multi-voltage circuit with ESD protection circuits in accordance with various embodiments of the present disclosure.

FIG. 1 is a schematic diagram showing a multi-voltage circuit 10 (or "circuit 10") with ESD protection circuits 103, 113 in accordance with various embodiments of the present disclosure. In some embodiments, the multi-voltage circuit 10 is part of a larger circuit, such as a buck converter. A high-side transistor ($M_{HS}$) 101 is electrically connected to a first voltage supply node 104 associated with a first voltage. In some embodiments, the first voltage is in a range from about 10 Volts to about 60 Volts. In some embodiments, the first voltage is in a range from about 25 Volts to about 50 Volts. A low-side transistor ($M_{LS}$) 102 is electrically connected to a second voltage supply node 105 associated with a second voltage (e.g., ground). A high voltage (high-V) detector 103 is electrically connected from the first voltage supply node 104 to the second voltage supply node 105. Embodiments omitting the high-V detector 103 are contemplated herein. A low voltage (low-V) clamp 113 is electrically connected from a third voltage supply node 114 associated with a third voltage (e.g., about 5 Volts) to a fourth voltage supply node 115 associated with a fourth voltage (e.g., ground).

In some embodiments, the high-side transistor 101 and the low-side transistor 102 are metal-oxide-semiconductor (MOS) transistors. In some embodiments, the high- and low-side transistors 101, 102 are N-type power MOS transistors. Power MOS transistors (or "power FETs", "power MOSFETs", etc.) typically employ higher aspect ratios (e.g., about 1000 micrometers to about 10000 or more micrometers) and longer channel lengths in order to handle high operating voltages without breaking down. For example, a typical power MOS transistor may be able to switch on the order of one amp of current (e.g., one to ten amps of current), whereas a core logic transistor may only switch on the order of one milliamp of current.

A drain electrode of the high-side transistor 101 is electrically connected to the first voltage supply node 104. A source electrode of the high-side transistor 101 is electrically connected to a node 106. A drain electrode of the low-side transistor 102 is electrically connected to the node 106. A source electrode of the low-side transistor 102 is electrically connected to the second voltage supply node 105.

A high-side control circuit 111 has an output terminal electrically connected to a gate electrode of the high-side transistor 101. The high-side control circuit 111 is biased by a third voltage supply node 114 and a fourth voltage supply node 115. Third voltage of the third voltage supply node 114 is smaller than first voltage of the first voltage supply node 104. For example, the first voltage may be in a range from about 25 Volts to about 50 Volts, and the third voltage may be in a range from about 3 Volts to about 6 Volts.

Figure 2:
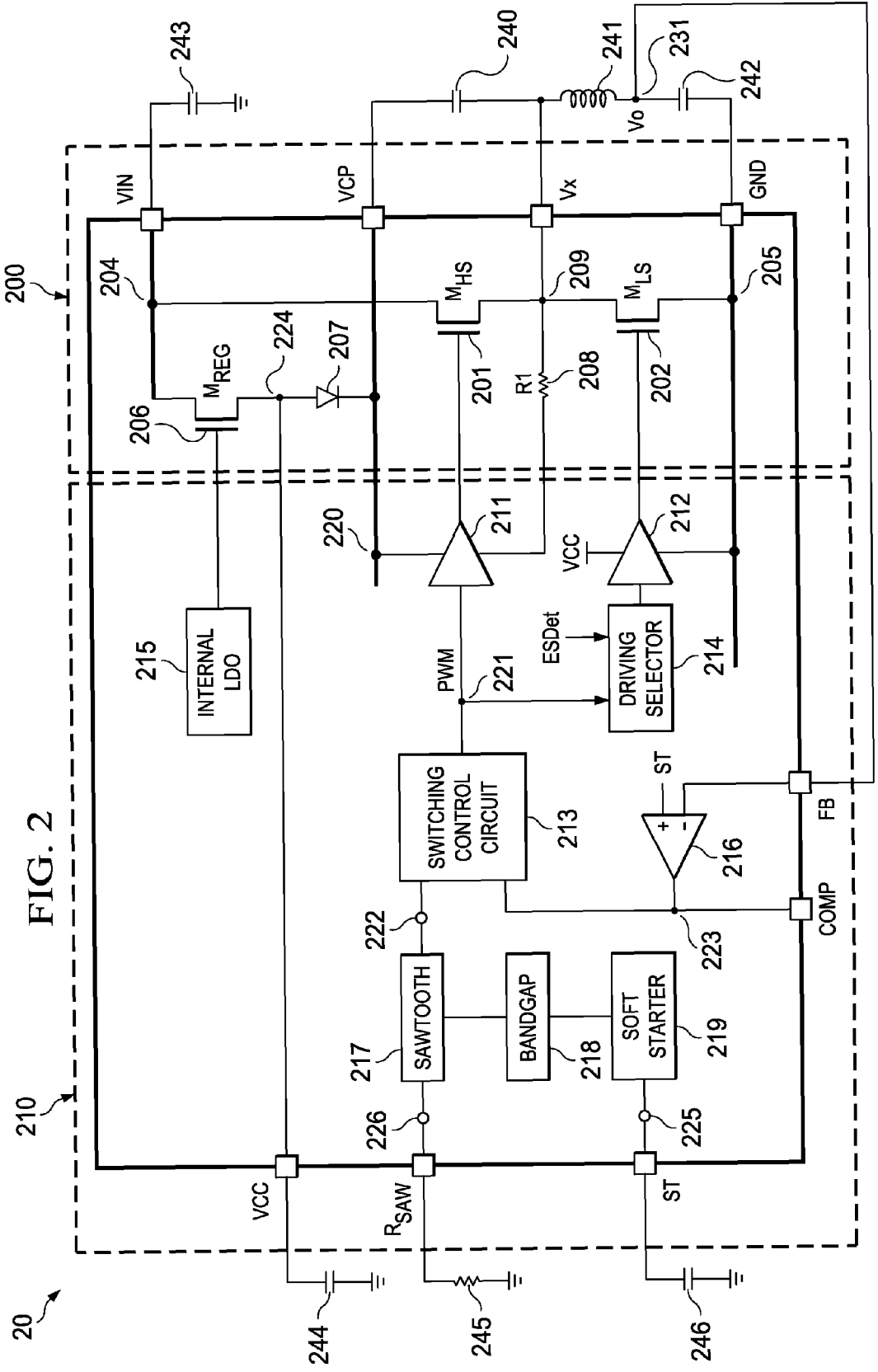
FIG. 2 is a diagram showing a converter circuit in accordance with various embodiments of the present disclosure.

FIG. 2 is a diagram showing a converter circuit 20 in accordance with various embodiments of the present disclosure. The converter circuit 20 is one of many possible realizations of the multi-voltage circuit 10 of FIG. 1. In some embodiments, the converter circuit 20 is a switching-type buck converter. High voltage circuit components 200 generate output voltage Vx from input voltage VIN, and also generate internal bias voltages VCC, VCP. Non-high voltage circuit components 210 operate at significantly lower voltage than the input voltage VIN, and at least partially act to control operations (e.g., voltage regulation, switching) of the high voltage circuit components 200.

A drain electrode of a high-side transistor 201 is electrically connected to a node 204 associated with the input voltage VIN. A source electrode of the high-side transistor 201 is electrically connected to a node 209 associated with the output voltage Vx. In some embodiments, the high-side transistor 201 is an N-type power MOSFET. A drain electrode of a low-side transistor 202 is electrically connected to the node 209. A source electrode of the low-side transistor 202 is electrically connected to a node 205 associated with a low voltage (e.g., ground). In some embodiments, the low-side transistor 202 is an N-type power MOSFET. A drain electrode of a regulator transistor 206 is electrically connected to the node 204. A source electrode of the regulator transistor 206 is electrically connected to a node 224 associated with the internal bias voltage VCC. A diode 207 has an anode terminal electrically connected to the node 224, and a cathode terminal electrically connected to a node 220 associated with the internal bias voltage VCP. A resistor 208 (R1) has a first terminal electrically connected to the node 209, and a second terminal electrically connected to a second bias terminal of a high-side driver 211.

A gate electrode of the high-side transistor 201 is electrically connected to an output terminal of the high-side driver 211. A first bias terminal of the high-side driver 211 is electrically connected to the node 220. An input terminal of the high-side driver 211 is electrically connected to a node 221 associated with an output terminal of a switching control circuit 213.

First and second bias terminals of a low-side driver 212 are electrically connected to the node 224 and the node 205, respectively. An output terminal of the low-side driver 212 is electrically connected to a gate electrode of the low-side transistor 202. An input terminal of the low-side driver 212 is electrically connected to an output terminal of a driving selector 214. An input terminal of the driving selector 214 is electrically connected the output terminal of the switching control circuit 213. A second input terminal of the driving selector 214 receives an ESD detection signal ESDet. In some embodiments, the driving selector 214 is a NAND gate. In some embodiments, the driving selector 214 is electrically connected to the input of the high-side driver 211 instead of to the low-side driver 212. In some embodiments, an additional driving selector similar to the driving selector 214 is electrically connected to the input of the high-side driver 211.

A first input terminal of the switching control circuit 213 is electrically connected to an output terminal of a sawtooth wave generator 217. A second input terminal of the switching control circuit 213 is electrically connected to an output terminal of a feedback comparator 216. In normal operation, the switching control circuit 213 generates a pulse-width modulation (PWM) signal PWM at the node 221. The PWM signal is generated based on a sawtooth signal generated by the sawtooth wave generator 217, and a comparison signal generated by the feedback comparator 216 at a node 223.

A first input terminal of the sawtooth wave generator 217 is electrically connected to an output terminal of a bandgap reference 218. A second input terminal of the sawtooth wave generator 217 is electrically connected to a node 226. An input terminal of the bandgap reference 218 is electrically connected to an output terminal of a soft starter circuit 219. An input terminal of the soft starter circuit 219 is electrically connected to a node 225.

An inverting input terminal of the feedback comparator 216 is electrically connected to a node 231 associated with a feedback voltage Vo. A non-inverting terminal of the feedback comparator 216 is electrically connected to the node 225 associated with a signal ST.

External components 240-246 are electrically connected to various terminals of the high voltage circuit components 200 and the low voltage circuit components 210. A first terminal of a capacitor 240 is electrically connected to the node 220 associated with the internal bias voltage VCP. A second terminal of the capacitor 240 is electrically connected to the node 209 associated with the output voltage Vx. A first terminal of an inductor 241 is electrically connected to the node 209. A second terminal of the inductor 241 is electrically connected to the node 231 associated with the feedback voltage Vo. A first terminal of a capacitor 242 is electrically connected to the node 231. A second terminal of the capacitor 242 is electrically connected to the node 205 associated with the low voltage (e.g., ground).

A capacitor 243 has a first terminal electrically connected to the node 204 associated with the input voltage VIN. A second terminal of the capacitor 243 is electrically connected to a low voltage source (e.g., the node 205, or ground). A capacitor 244 has a first terminal electrically connected to the node 224 associated with the internal bias voltage VCC. A second terminal of the capacitor 244 is electrically connected to the low voltage source. A first terminal of a resistor 245 is electrically connected to the node 226. A second terminal of the resistor 245 is electrically connected to the low voltage source. A first terminal of a capacitor 246 is electrically connected to the node 225. A second terminal of the capacitor 246 is electrically connected to the low voltage source.

Figure 3:
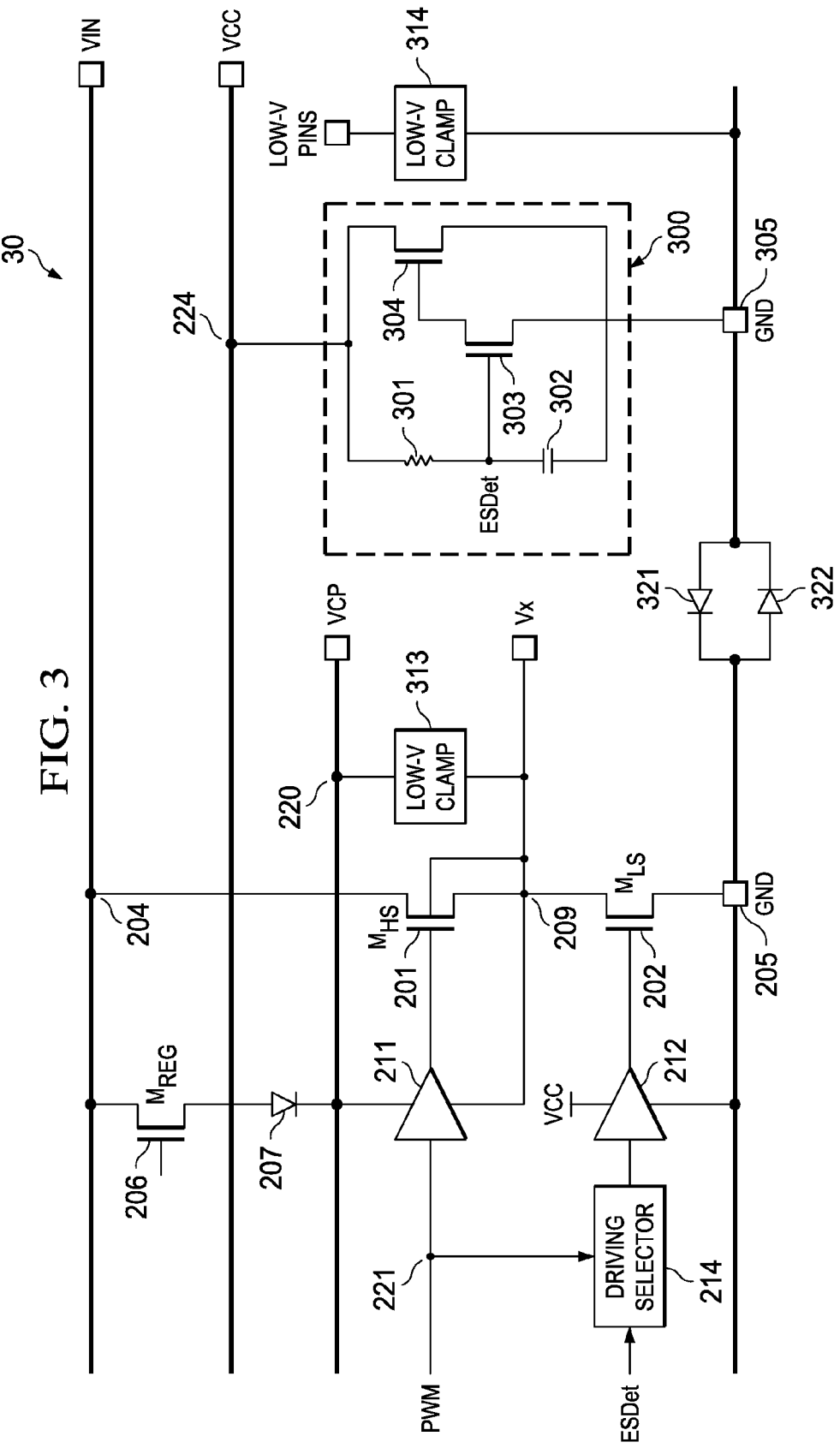
FIG. 3 is a diagram showing an ESD protection circuit of the converter circuit of FIG. 2 in accordance with various embodiments of the present disclosure.

FIG. 3 is a diagram showing an ESD protection circuit 30 of the converter circuit 20 in accordance with various embodiments of the present disclosure. The ESD protection circuit 30 includes some components (e.g., the high- and low-side transistors 201, 202) of the converter circuit 20. A first low-V clamp 313 has a first terminal electrically connected to the node 220 associated with the internal bias voltage VCP. A second terminal of the first low-V clamp 313 is electrically connected to the node 209 associated with the output voltage Vx. At least one further low-V clamp 314 has a first terminal electrically connected to a low-V pin (e.g., node 225, node 226). A second terminal of the at least one further low-V clamp 314 is electrically connected to a node 305 (e.g., ground).

In some embodiments, the node 305 corresponds to a first ground, and the node 205 corresponds to a second ground. A diode pair 321, 322 may be included to avoid noise interference between the nodes 205 and 305. An anode terminal of a first diode 321 is electrically connected to the node 305. A cathode terminal of the first diode 321 is electrically connected to the node 205. An anode terminal of a second diode 322 is electrically connected to the node 205. A cathode terminal of the second diode 322 is electrically connected to the node 305.

A dynamic floating gate clamp 300 (shown in detail in FIG. 3) has a first terminal electrically connected to the node 224, and a second terminal electrically connected to the node 205 and/or 305. The dynamic floating gate clamp 300 generates the ESD detection signal ESDet. A first terminal of a resistor 301 is electrically connected to the node 224. A second terminal of the resistor 301 is electrically connected to a first terminal of a capacitor 302 and a gate electrode of a first transistor 303. A second terminal of the capacitor 302 is electrically connected to a source electrode of the first transistor 303 (the node 205). A drain electrode of the first transistor 303 is electrically connected to a gate electrode of a second transistor 304. A drain electrode of the second transistor 304 is electrically connected to the node 224. A source electrode of the second transistor 304 is electrically connected to the node 205 and/or 305. In normal operation, the ESD detection signal is substantially the voltage VCC. The first transistor 303 is turned on, which pulls down voltage at the gate electrode of the second transistor 304. The second transistor 304 is turned off.

ESD zapping may occur at the node 204 electrically connected to a pin VIN. ESD charge rapidly builds up at the node 204. Voltage at the node 224 is coupled high through the regulator transistor 206. Prior to the ESD zapping, the ESD detection signal ESDet is at a low voltage (e.g., ground). The ESD detection signal ESDet is pulled high through the dynamic floating gate clamp 300 in response to the upward transient in the internal bias voltage VCC at the node 224. However, the pulling high of the ESD detection signal ESDet is subject to an RC delay of the resistor 301 and the capacitor 302. So, the ESD detection signal is at a low voltage during the ESD zapping and discharging of the built up charge. The upward transient in the internal bias voltage VCC also acts to turn on the low-side driver 212.

In some embodiments, the driving selector 214 is a NAND gate. A first input terminal of the NAND gate is electrically connected to the node 221 for receiving the PWM signal PWM. A second input terminal of the NAND gate is electrically connected to the gate electrode of the first transistor 303 for receiving the ESD detection signal ESDet. With the ESD detection signal ESDet at the low voltage during the ESD zapping, voltage at the output terminal of the NAND gate is a high voltage (e.g., 5 Volts). The high voltage is received by the low-side driver 212, and the low-side transistor 202 is turned on by high voltage (e.g., substantially the voltage VCC) outputted by the low-side driver 212. The charge built up at the node 204 is discharged to ground through a discharge path including an NPN parasitic transistor of the high-side transistor 201 and a channel of the low-side transistor 202.

Figure 4:
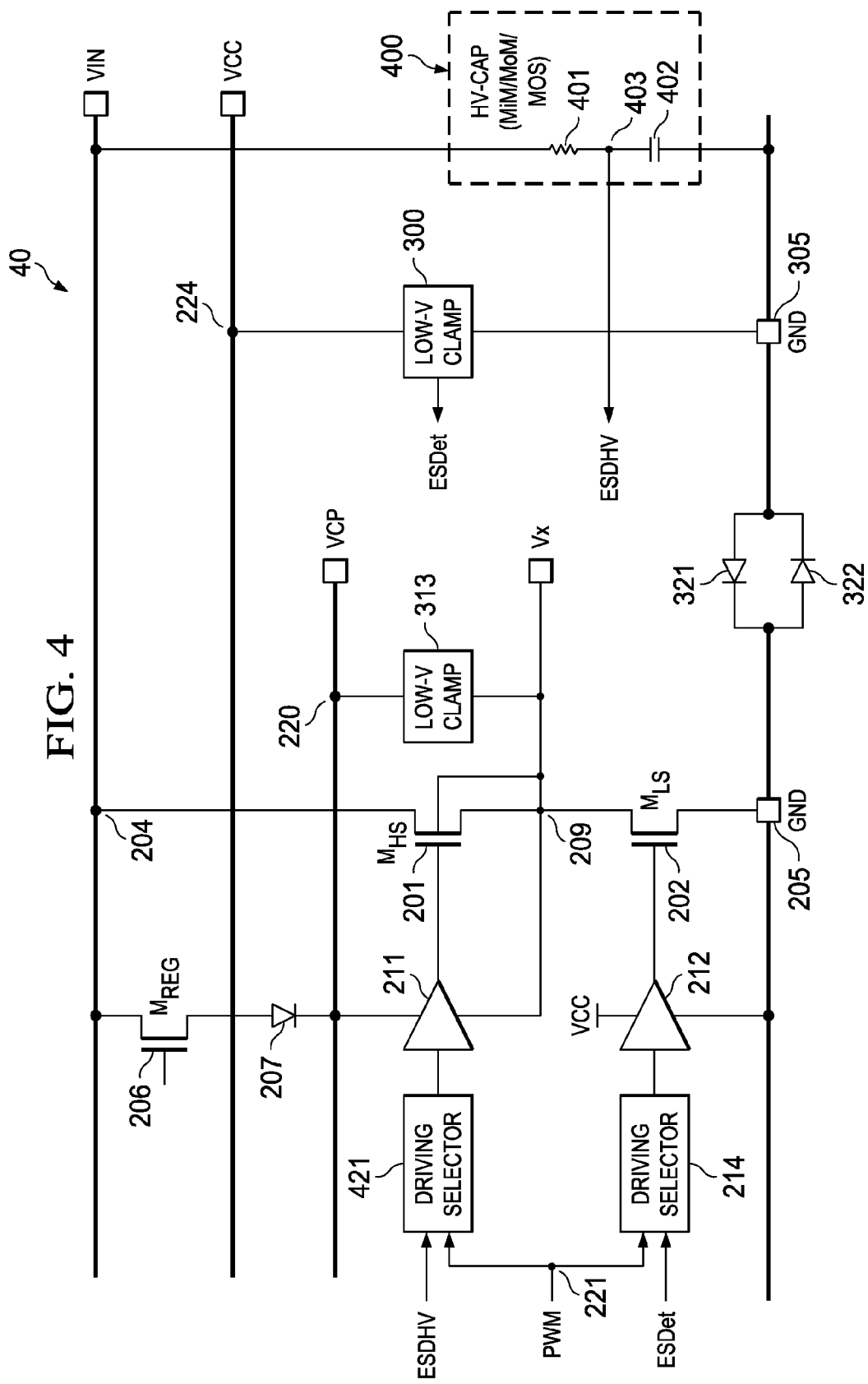
FIG. 4 is a diagram showing an ESD protection circuit of the converter circuit of FIG. 2 in accordance with various other embodiments of the present disclosure.

FIG. 4 is a diagram showing an ESD protection circuit 40 of the converter circuit 20 in accordance with various embodiments of the present disclosure. The ESD protection circuit 40 is similar to the ESD protection circuit 30 in many ways, and like reference numerals are used to indicate like features. A high-V detector 400 is electrically connected to the node 204 and the node 305. A first terminal of a resistor 401 of the high-V detector 400 is electrically connected to the node 204. A first terminal of a capacitor 402 of the high-V detector 400 is electrically connected to a second terminal of the resistor 401. A second terminal of the capacitor 402 is electrically connected to the node 305. A high voltage ESD detection signal ESDHV is generated by the high-V detector at a node 403 corresponding to the first terminal of the capacitor 402 and the second terminal of the resistor 401.

The high voltage ESD detection signal ESDHV generated at the node 403 is received by a high-side driving selector 421. A first input terminal of the high-side driving selector 421 is electrically connected to the node 403. A second input terminal of the high-side driving selector 421 is electrically connected to the node 221 associated with the PWM signal PWM. An output terminal of the high-side driving selector 421 is electrically connected to an input terminal of the high-side driver 211. In some embodiments, the high-side driving selector 421 is a NAND gate.

In normal operation, the high voltage ESD detection signal ESDHV is substantially equal to the input voltage VIN. Prior to the ESD event (zapping at the node 204), the high voltage ESD detection signal ESDHV is about ground (e.g., 0 Volts). When zapping occurs at the node 204, the high voltage ESD detection signal ESDHV slowly transitions upward with speed determined by an RC delay established by the resistor 401 and the capacitor 402. While the high voltage ESD detection signal ESDHV is slowly transitioning from about ground to a higher voltage, output of the high-side driving selector 421 is held high. The high output of the high-side driving selector 421 drives the high-side driver 211 to turn on the high-side transistor 201. The ESD charge built up at the node 204 is discharged to ground through a discharge path including a channel of the high-side transistor 201 and a channel of the low-side transistor 202.

Figure 5:
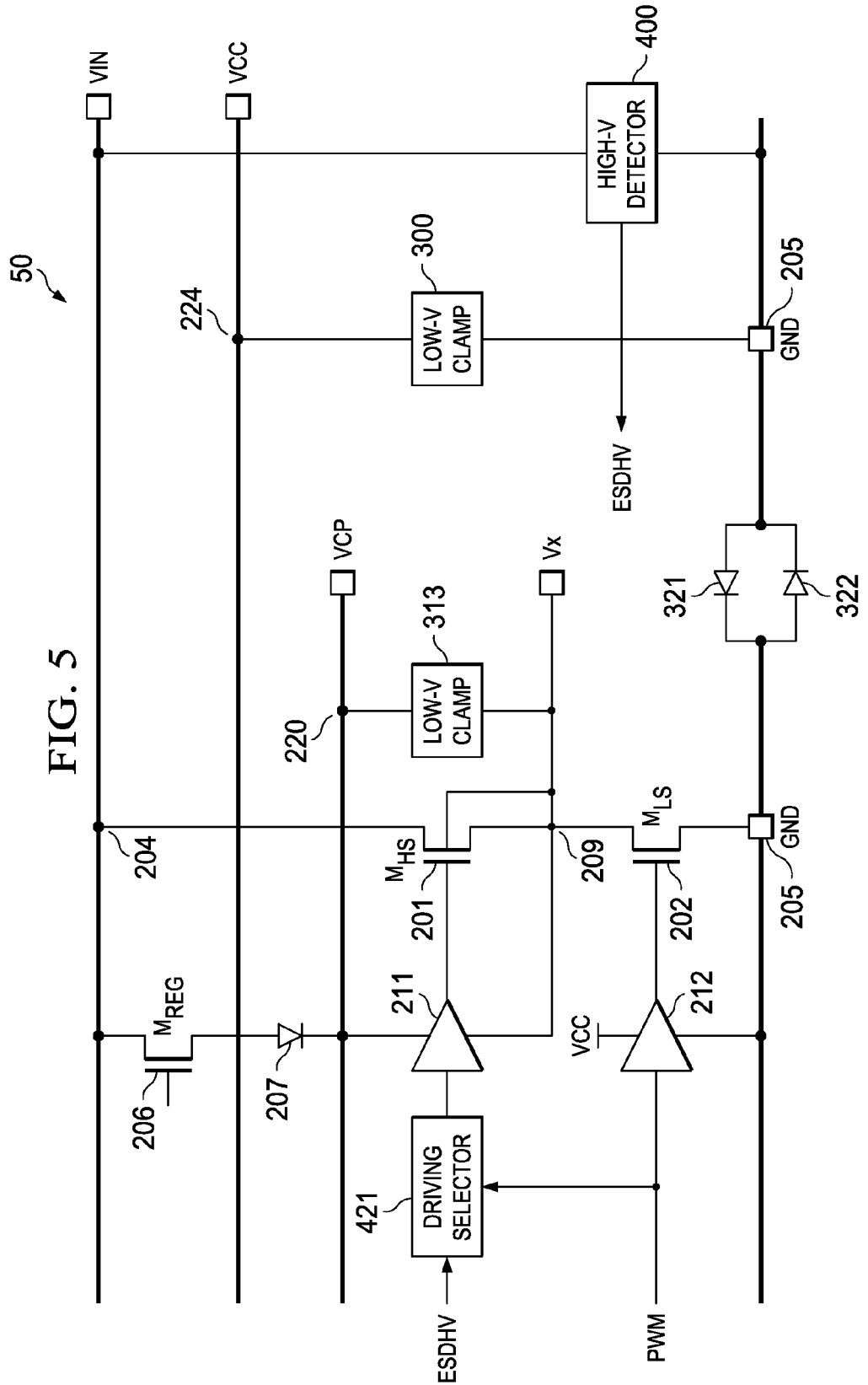
FIG. 5 is a diagram showing an ESD protection circuit of the converter circuit of FIG. 2 in accordance with various additional embodiments of the present disclosure.

FIG. 5 is a diagram showing an ESD protection circuit 50 of the converter circuit 20 in accordance with various embodiments of the present disclosure. The ESD protection circuit 50 is similar to the ESD protection circuits 30, 40, with like reference numerals indicating like features. The driving selector 214 is not included in the ESD protection circuit 50. Connections are modified as shown in FIG. 5. The PWM signal PWM is inputted directly to the input terminal of the low-side driver 212. As a result, the low-side transistor 212 is not turned on during the ESD event (zapping at the node 204). The built up ESD charge at the node 204 is discharged to ground through a discharge path including a channel of the high-side transistor 201 and an NPN parasitic transistor of the low-side transistor 202.

Figure 6:
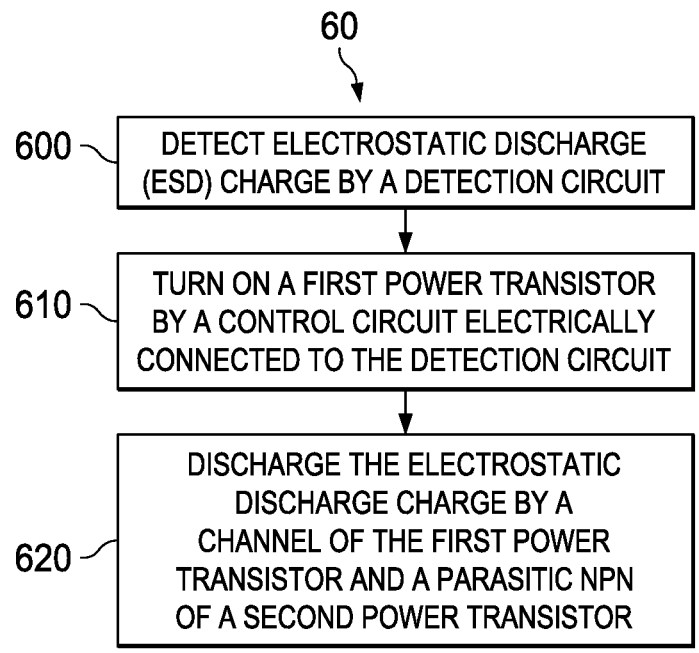
FIG. 6 is a flowchart of a process for providing ESD protection in accordance with various embodiments of the present disclosure.

FIG. 6 is a flowchart of a process 60 for providing ESD protection in accordance with various embodiments of the present disclosure. In some embodiments, the process 60 is performed by an ESD protection circuit, such as the ESD protection circuits 30, 50. ESD charge is detected 600 by a detection circuit. In some embodiments, the ESD charge is detected by a low-V clamp (e.g., the low-V clamp 300). In some embodiments, the ESD charge is detected by a high-V detector (e.g., the high-V detector 400).

A first power transistor is turned on 610 by a control circuit electrically connected to the detection circuit. In some embodiments, the first power transistor is a high-side transistor (e.g., the high-side transistor 201). In some embodiments, the first power transistor is a low-side transistor (e.g., the low-side transistor 202). In some embodiments, the first transistor is turned on 610 by a driver (e.g., the high-side driver 211) electrically connected to a selector circuit (e.g., the driving selector 421), where the selector circuit is electrically connected to the detection circuit. In some embodiments, the selector circuit is a NAND gate.

The ESD charge is discharged 620 (e.g., to ground) by a channel of the first power transistor and a parasitic NPN transistor of a second power transistor. In some embodiments, the first power transistor is the high-side transistor, and the second power transistor is the low-side transistor. In some embodiments, the first power transistor is the low-side transistor, and the second power transistor is the high-side transistor.

Figure 7:
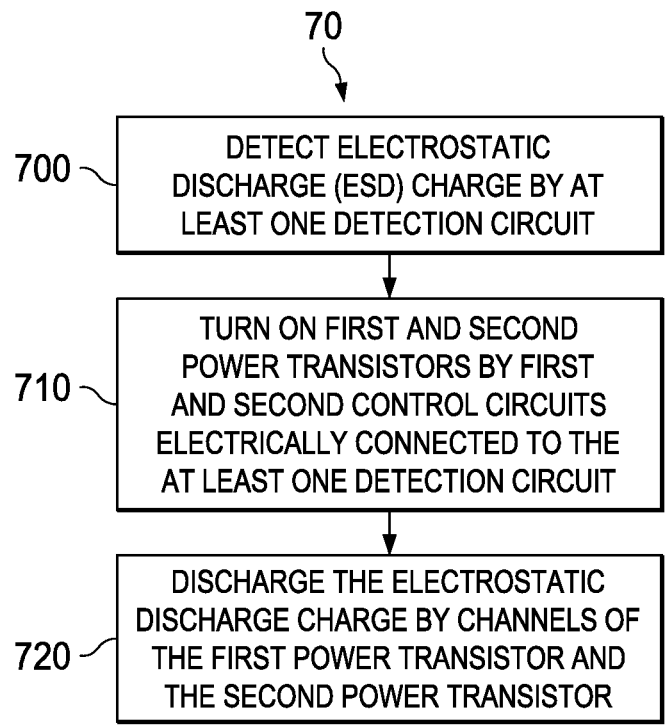
FIG. 7 is a flowchart of a process for providing ESD protection in accordance with various other embodiments of the present disclosure.

FIG. 7 is a flowchart of a process 70 for providing ESD protection in accordance with various embodiments of the present disclosure. In some embodiments, the process 70 is performed by an ESD protection circuit, such as the ESD protection circuit 40. ESD charge is detected 700 by at least one detection circuit. In some embodiments, the ESD charge is detected by a low-V clamp (e.g., the low-V clamp 300) and a high-V detector (e.g., the high-V detector 400).

A first power transistor and a second power transistor are turned on 710 by first and second control circuits electrically connected to the at least one detection circuit. In some embodiments, the first power transistor is a high-side transistor (e.g., the high-side transistor 201). In some embodiments, the second power transistor is a low-side transistor (e.g., the low-side transistor 202). In some embodiments, the first transistor is turned on 710 by a first driver (e.g., the high-side driver 211) electrically connected to a first selector circuit (e.g., the driving selector 421), where the first selector circuit is electrically connected to the first detection circuit. In some embodiments, the first selector circuit is a NAND gate. In some embodiments, the second transistor is turned on 710 by a second driver (e.g., the low-side driver 212) electrically connected to a second selector circuit (e.g., the driving selector 214), where the second selector circuit is electrically connected to the second detection circuit. In some embodiments, the second selector circuit is a NAND gate. The ESD charge is discharged 720 (e.g., to ground) by channels of the first and second power transistors.

Embodiments may achieve advantages. The ESD protection circuits 30, 40, 50 "reuse" the high-side transistor 201 and the low-side transistor 202 as a discharge path for draining ESD charge to ground. The ESD detection signals ESDet, ESDHV are generated by RC circuits to introduce a delay when discharging the ESD charge to ground, and pass the PWM signal PWM to the drivers 211, 212 during normal operation. Using the embodiments disclosed herein, no high-V clamp is required, which eliminates significant design effort, and accelerates time-to-market for high-V products using the ESD protection circuits 30, 40, 50.

In accordance with various embodiments of the present disclosure, a device includes a first power transistor, a second power transistor electrically connected in series with the first power transistor, a first electrostatic discharge (ESD) detection circuit, and a first control circuit electrically connected to the first ESD detection circuit and the first power transistor.

In accordance with various embodiments of the present disclosure, a method comprises (a) detecting electrostatic discharge (ESD) charge by a detection circuit; (b) turning on a first power transistor by a control circuit electrically connected to the detection circuit; and (c) discharging the ESD charge by a channel of the first power transistor and a parasitic NPN transistor of a second power transistor.

In accordance with various embodiments of the present disclosure, a method comprises (a) detecting electrostatic discharge (ESD) charge by at least one detection circuit; (b) turning on a first power transistor by a first control circuit electrically connected to the at least one detection circuit; (c) turning on a second power transistor by a second control circuit electrically connected to the at least one detection circuit; and (c) discharging the ESD charge by a first channel of the first power transistor and a second channel of a second power transistor.

As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising". Moreover, the term "between" as used in this application is generally inclusive (e.g., "between A and B" includes inner edges of A and B).

Although the present embodiments and their advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A device comprising:
   a first power transistor;
   a second power transistor electrically connected in series with the first power transistor;
   a first electrostatic discharge (ESD) detection circuit;
   a first control circuit electrically connected to the first ESD detection circuit and the first power transistor, the first control circuit comprising:
      a first driver having an output terminal electrically connected to a gate electrode of the first power transistor; and
      a first driving selector having an input terminal electrically connected to the first ESD detection circuit, and an output terminal electrically connected to an input terminal of the first driver, wherein the first driving selector is a NAND gate; and
   a second control circuit electrically connected to the second power transistor and a second ESD detection circuit, the second ESD detection circuit different than the first ESD detection circuit.

2. The device of claim 1, wherein:
   the first power transistor is a high-side transistor of a buck converter; and
   the second power transistor is a low-side transistor of the buck converter.

3. The device of claim 1, wherein the second control circuit comprises:
   a second driver having an output terminal electrically connected to a gate electrode of the second power transistor; and
   a second driving selector having an input terminal electrically connected to the second ESD detection circuit, and an output terminal electrically connected to an input terminal of the second driver.

4. The device of claim 3, wherein the second driving selector is a NAND gate.

5. The device of claim 1, wherein the first ESD detection circuit comprises:

a resistor having a first terminal electrically connected to a first voltage supply node;

a capacitor having a first terminal electrically connected to a second terminal of the resistor, and a second terminal electrically connected to a second voltage supply node;

a first transistor having a gate electrode electrically connected to the second terminal of the resistor, and a source electrode electrically connected to the second voltage supply node; and a second transistor having a gate electrode electrically connected to a drain electrode of the first transistor, a drain electrode electrically connected to the first voltage supply node, and a source electrode electrically connected to the second voltage supply node.

6. The device of claim 1, wherein the first ESD detection circuit comprises:

a high-voltage resistor having a first terminal electrically connected to a high voltage supply node; and a high-voltage capacitor having a first terminal electrically connected to a second terminal of the high-voltage resistor, and a second terminal electrically connected to a low voltage supply node.

7. The device of claim 1, wherein the first power transistor has width greater than about 1000 micrometers, and the second power transistor has width greater than about 1000 micrometers.

8. A method, comprising:

(a) detecting electrostatic discharge (ESD) charge by a first detection circuit and a second detection circuit, the first detection circuit different than the second detection circuit, the first detection circuit connected to a first power rail and ground, the second detection circuit connected to a second power rail and ground;

(b) turning on a first power transistor by a control circuit having an output terminal connected to a gate terminal of the first power transistor;

(c) discharging ESD charge by a channel of the first power transistor and a parasitic NPN transistor of a second power transistor; and (d) receiving a detection signal by a driving selector.

9. The method of claim 8, wherein:

(b) includes turning on a high-side transistor of a converter circuit by the control circuit.

10. The method of claim 8, wherein (a) includes delaying rising voltage of a detection signal of the first detection circuit by a resistor-capacitor delay.

11. The method of claim 10, wherein (b) includes turning on the first power transistor by the driving selector and a driver electrically connected to the driving selector and a gate electrode of the first power transistor.

12. The method of claim 11, wherein (d) comprises:
receiving the detection signal by a NAND gate.

13. A method, comprising:

(a) detecting electrostatic discharge (ESD) charge by a first detector and a second detector, wherein:

the first detector is connected to a first power rail and ground; and the second detector is connected to a second power rail and ground, wherein the first detector is different than the second detector, the first detector comprises first components, the second detector comprises second components, no first components are common to the second detector, and no second components are common to the first detector;

(b) turning on a first power transistor by a first control circuit electrically connected to the first detector;

(c) turning on a second power transistor by a second control circuit electrically connected to the second detector; and (d) discharging the ESD charge by a first channel of the first power transistor and a second channel of a second power transistor.

14. The method of claim 13, wherein:

(b) includes turning on the first power transistor by the first control circuit electrically connected to a low voltage detection circuit; and (c) includes turning on the second power transistor by the second control circuit electrically connected to a high voltage detection circuit.

15. The method of claim 14, wherein:

(b) includes turning on the first power transistor by a first NAND gate electrically connected to the low voltage detection circuit; and (c) includes turning on the second power transistor by a second NAND gate electrically connected to the high voltage detection circuit.

16. The method of claim 15, wherein (b) further includes turning on the first power transistor by a first driver electrically connected to the first NAND gate and the first power transistor.

17. The method of claim 15, wherein (c) further includes turning on the second power transistor by a second driver electrically connected to the second NAND gate and the second power transistor.

18. The method of claim 13, wherein (a) includes:
detecting the ESD charge by a low voltage clamp of a converter circuit.

19. The method of claim 13, wherein:

(b) includes turning on a high-side transistor of a converter circuit by the first control circuit electrically connected to at least one detection circuit; and (c) includes turning on a low-side transistor of the converter circuit by the second control circuit electrically connected to at least one detection circuit.

20. The method of claim 13, wherein (a) includes delaying rising voltage of a detection signal of at least one of the first detector and the second detector by a resistor-capacitor delay.

* * * * *